United States Patent [19]

Coughlin et al.

[11] 4,260,867
[45] Apr. 7, 1981

[54] ELECTRODE DRIVE AND NOZZLE SYSTEM FOR AUTOMATIC AIR-CARBON ARC CUTTING AND GOUGING TORCH

[75] Inventors: William J. Coughlin; Stephen A. Hoffman; Jerry R. Hummel, all of Lancaster, Ohio

[73] Assignee: Arcair Company, Lancaster, Ohio

[21] Appl. No.: 25,437

[22] Filed: Mar. 30, 1979

[51] Int. Cl.³ .................. B23K 9/12; B65H 17/22
[52] U.S. Cl. .................. 219/70; 219/69 R; 226/187
[58] Field of Search .......... 219/69 R, 70, 137.61, 219/137.7, 69 G; 226/186, 187; 228/41

[56] References Cited

U.S. PATENT DOCUMENTS

| 1,966,200 | 7/1934 | Eskilson | 228/41 X |
|---|---|---|---|
| 2,227,753 | 1/1941 | Ingham | 226/187 X |
| 2,525,590 | 10/1950 | Collins | 226/186 X |
| 2,784,293 | 3/1957 | Adams | 219/70 |
| 2,989,617 | 6/1961 | Stepath | 219/69 G |
| 3,016,451 | 1/1962 | Cornell, Jr. | 226/187 X |
| 3,100,255 | 8/1963 | Miller | 219/70 |
| 3,131,290 | 4/1964 | Stepath | 219/69 R X |
| 3,234,317 | 2/1966 | Henderson | 174/15 WF |
| 3,317,779 | 5/1967 | Henderson | 219/137.7 X |
| 3,659,071 | 4/1972 | Henderson | 219/69 G |
| 3,730,136 | 5/1973 | Okada | 219/137.61 X |
| 4,045,642 | 8/1977 | Driscoll | 219/70 |

FOREIGN PATENT DOCUMENTS

| 903853 | 6/1972 | Canada | 219/70 |
|---|---|---|---|
| 1177266 | 9/1964 | Fed. Rep. of Germany | 228/41 |
| 4222876 | 8/1967 | Japan | 219/70 |
| 928023 | 2/1965 | United Kingdom | 219/137.7 |
| 1301276 | 12/1972 | United Kingdom | 226/187 |

Primary Examiner—Thomas J. Kozma
Assistant Examiner—Keith E. George
Attorney, Agent, or Firm—E. Eugene Innis; James C. Simmons

[57] ABSTRACT

An automatic air-carbon arc cutting and gouging torch having a drive for the elongated electrode consisting of opposed wheels biased toward the electrode for frictional contact to drive the electrode by driving one of the wheels. Each wheel can be adjusted about a pivot point to compensate for curvature of the electrode, changes in diameter, or mis-aligned joints in successive electrodes. The torch includes an improved nozzle to conduct both current and process air to the electrode thus lowering the operating temperature of the torch.

10 Claims, 4 Drawing Figures

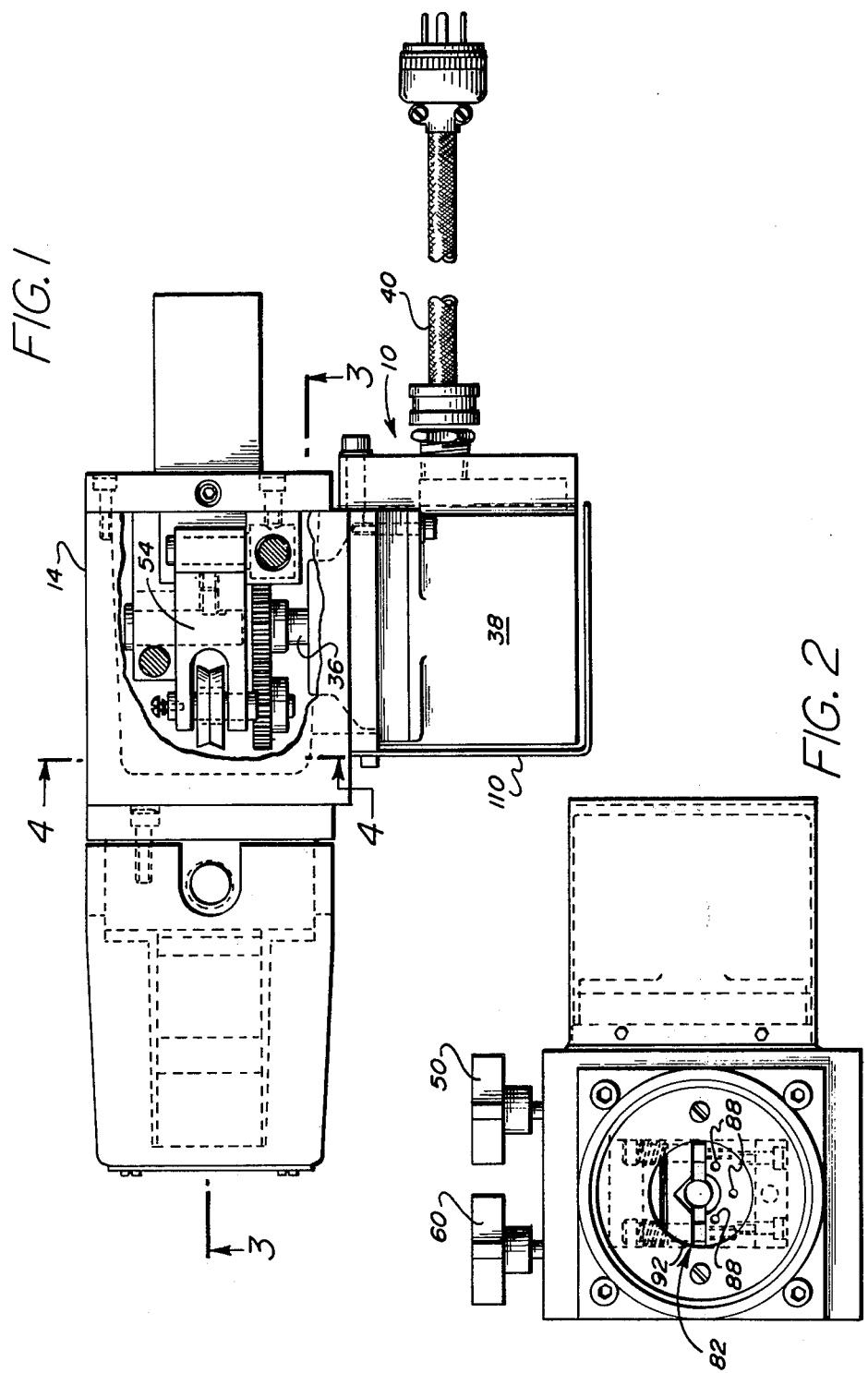

ELECTRODE DRIVE AND NOZZLE SYSTEM FOR AUTOMATIC AIR-CARBON ARC CUTTING AND GOUGING TORCH

BACKGROUND OF THE INVENTION

1. Field of the Invention

This invention pertains to torches and in particular to automatic torches used in the Air-Carbon Arc Cutting and Gouging Process. In the Air-Carbon Arc Cutting and Gouging Process an electrode is used to strike and maintain an arc between a workpiece causing melting of metal underneath the arc. As melting progresses a stream of high pressure air directed along the electrode to the arc causes the molten metal to be forcibly removed from the influence of the arc, thus leaving a groove or gouge, in the surface of the workpiece. The process can be also used to cut completely through the workpiece in the area traversed by the electrode and the arc. Torches for use in the Air-Carbon Arc Cutting and Gouging Process include an automatic torch wherein the torch is mounted on a carriage or other device for movement along on a predetermined path. Automatic torches include means to feed electrodes toward the workpiece at a rate selected to match consumption of the electrode by the electric arc. Most automatic torches include provision for using jointed electrodes so that successive electrodes (lengths) can be mated to, in effect, provide a continuous electrode of indeterminate length.

2. The Prior Art

One type of automatic Air-Carbon Arc Cutting and Gouging Torch is disclosed in U.S. Pat. No. 3,317,779. In this patent rollers are used to frictionally engage the electrode and feed it through a nozzle containing a contact shoe which conducts electricity to the electrode. The nozzle has provision for directing air along the electrode to the arc. The patent includes means for pivoting the housing supporting drive rolls having a fixed position relative to each other about an axis to, in effect, change the spacing between the rollers and increase frictional contact with the electrode.

Means for controlling the torch including the spacing of the torch to the workpiece and the feeding of the electrode are disclosed in U.S. Pat. No. 3,659,071. The '071 patent is an improved version of an automatic torch and control system.

Jointed electrodes for use in automatic torches are disclosed in U.S. Pat. No. 3,131,290.

Lastly, the current state of the art is reflected in the Model N Automatic Air-Carbon Arc Cutting and Gouging Torch manufactured and sold by the Arcair Company of Lancaster, Ohio.

One of the problems with prior art automatic torches is compensating for electrodes that are not perfectly straight, electrodes that vary in diameter for a given nominal size, and poor joint fit of successive lengths of electrode.

SUMMARY OF THE INVENTION

It has been discovered that if an electrode drive system is employed which includes a pair of rollers used to frictionally engage the electrode that are normally biased toward each other but which are independently adjustable by pivoting around a point to move each roller toward or away from the electrode, a drive system results which can accomodate for electrodes that are less than straight, of varying diameter within a given size, and show poor joint fit. It has also been discovered an improved nozzle results from utilizing a pair of shoes sized to accomodate the electrode one shoe of which contains means to conduct air toward the arc along the outside of the torch while both shoes are adapted to carry current to the electrode, the air serving to cool the shoes and the nozzle of the torch. Operating pressure inside the torch can be decreased by including a chamber to receive the processed air and equalize the same before directing it through the shoe and out the nozzle.

Therefore, it is the primary object of the present invention to provide an improved automatic air-carbon arc cutting and gouging torch.

It is another object of the present invention to provide an improved electrode drive means for an automatic air-carbon arc cutting and gouging torch.

It is still another object of the present invention to provide an improved nozzle for an automatic Air-Carbon Arc Cutting and Gouging Torch.

It is yet another object of the present invention to provide an automatic Air-Carbon Arc Cutting and Gouging Torch that operates at lower delivered air pressure.

It is a further object of the present invention to provide an automatic Air-Carbon Arc Cutting and Gouging Torch that operates at lower temperature due to utilization of the process air for cooling of the nozzle.

BRIEF DESCRIPTION OF THE DRAWING

FIG. 1 is a top plan view of an automatic Air-Carbon Arc Cutting and Gouging Torch with a portion of the top broken away to illustrate internal details of the torch.

FIG. 2 is a front view of the torch of FIG. 1.

DESCRIPTION OF THE PREFERRED EMBODIMENT

Figure 3:
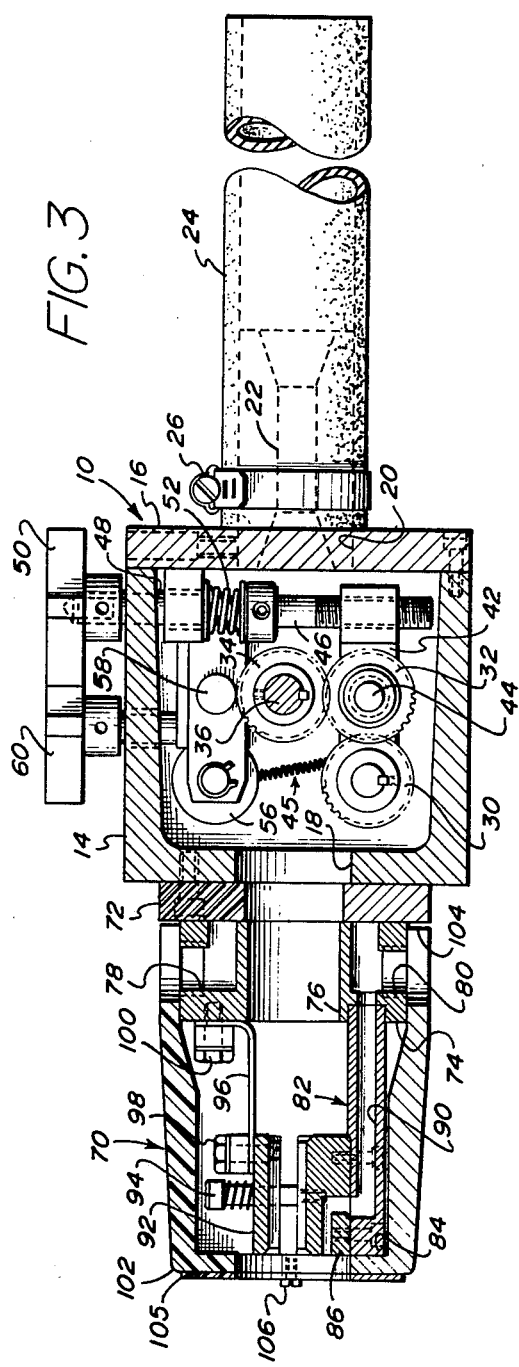
FIG. 3 is a section taken along the lines 3—3 of FIG. 1.

Referring to the drawing and in particular to FIGS. 1 and 3, the torch 10 includes a housing 14 with a cover 16. Housing 14 includes an aperture 18 aligned with an aperture 20 to permit an elongated electrode (not shown) to be passed through the cover 16 and housing 14. On the entry end of torch 10 cover 16 can include an electrode guide tube 22 covered by an insulated covering or tubing 24 affixed to guide tube 22 by a suitable device such as hose clamp 26. Guide tube 22 is adapted to align the electrode with the longitudinal axis of the housing and with the longitudinal axis of delivery aperture 18.

Disposed within housing 14 is a drive mechanism including a drive roller 30 driven by a drive gear 32 which in turn is driven by a motor drive gear 34 mounted on a shaft 36 of motor 38. Motor 38 is preferably a synchronous stepping motor which is provided with electrical conduit 40 for mating with a suitable electrical control system (not shown) to drive the motor in response to the rate of consumption to the electrode or other automatic torch parameters as is well known in the art. One such parameter is the distance of the torch nozzle to the workpiece which may vary due to varying surface condition of the workpiece as described in the specification of U.S. Pat. No. 3,659,071.

Figure 4:
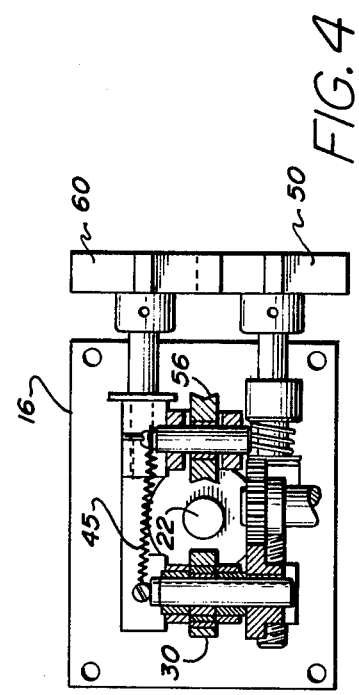
FIG. 4 is a section taken along the lines 4—4 of FIG. 1.

Drive roller 30 is mounted in a yoke 42 so that the roller 30 can be pivoted about shaft 44 of gear 32. Pivoting of roller 30 is accomplished by means of the pushrod 46 which is acted upon by a shaft 48 threadably mounted through housing 14 and controlled by knob 50. Coil spring 52 is included to maintain the position of yoke 42 and hence drive roller 30. Independently mounted within the housing by yoke 54 is an upper or idler roller 56. Idler roller 56 is adapted to pivot around shaft 58 and can be pivoted by a mechanism similar to the pivoting mechanism of drive roller 30 which in turn is controlled by knob 60. Drive roller 30 and idler roller 56 are normally urged toward each other by biasing means 45. Means 45 can be a coil spring fixed between the shafts of rollers 30,56 by screws such as shown in FIG. 4.

Rollers 30 and 56 are mounted in a juxtaposition so that they can be brought into frictional contact with an electrode inserted through guide tube 22 for movement through the housing in a direction from aperture 20 toward aperture 18 and outwardly of the housing 14.

Forward of housing 14 on the end delivering the electrode there is included a nozzle assembly 70. Nozzle assembly 70 includes an insulating spacer or plate 72 separating housing 14 from a conductive ring 74. Conductive ring 74 includes an annular internal bore which aligns with aperture 18 of housing of 14. The outside surface of ring 74 includes an annular groove 78 which includes at least 4 equally spaced threaded apertures 80 to receive a conventional hose fitting for an air hose or a combination concentric electrical cable and air hose such as disclosed in U.S. Pat. No. 3,234,317.

Forward of ring 74 is a lower shoe assembly 82 including a bottom piece 84 and a top or nozzle piece 86 including at least one orifice 88 (FIG. 2). Bottom shoe assembly 82 includes a hollow passage 90 communicating with annular passage 78 of ring 74 to make a continuous passage from nozzle aperture 88 through top piece 86 and bottom piece 84 of shoe 82 to the ring 74. Spaced apart from bottom shoe 82 is a top shoe 92 adapted through biased screw assembly 94 for movement toward bottom shoe 82. As shown in FIG. 2 bottom shoe 82 and top shoe 92 contain longitudinal grooves semicircular and V in shape respectively to accomodate a generally cylindrical electrode to provide good surface contact with the shoes to the electrode. Top shoe 92 is connected to ring 74 by means of a flexible electrical conduit 96 which is held in place by suitable bolt and insulator assemblies 98 and 100.

Nozzle assembly 70 includes an insulating cover 102 provided with four apertures 104 spaced to mate with threaded apertures 80 of ring 74. The forward end of nozzle assembly 70 includes an insulating cover 105 fastened to the nozzle by suitable means such as screws 106.

The torch includes a shield 110 mounted on the housing for motor 38 to prevent excessive heat from the arc contacting motor 38 which would shorten its service life.

In operation at least one air hose and one concentric cable are connected to separate apertures 78 of ring 74. The nonused apertures are closed by suitable gas type plugs (not shown).

Lower shoe portion 86 and upper shoe 92 are selected based upon the diameter of the electrode being used with the torch and positioned in nozzle assembly 70. Electrodes which would be used in the automatic torch vary from 5/16 to ¾ inches (29 mm to 19.1 mm) in diameter. For each size electrode there is provided a lower shoe 82 having a semicircular cross section complimentary to the diameter of the electrode. However, upper shoe 92 only need be provided in two sizes one for electrodes 5/16 to ½ inch (7.9 mm to 12.7 mm) diameter and one for electrodes ⅝ inch to ¾ inch (15.9 mm to 19.1 mm) in diameter. The shoes are placed in the nozzle and adjusted for contact with the electrode.

Knob 50 is rotated to loosen the tension on drive roller 30. The electrode is then inserted through guide tube 22 between drive roller 30 and idler roller 56 through nozzle assembly 70 contacting lower shoe 86 and upper shoe 92. After the electrode is inserted knob 60 is turned counterclockwise to allow lower idler roller 56 to drop into frictional engagement with the electrode. Then knob 60 is turned clockwise to lock idler roller 56 in position. After idler roller 56 is in position knob 50 is turned clockwise to raise pivot arm 42 and move drive roller 30 into frictional engagement with the electrode. Because of the presence of spring 45 idler roller 56 and drive roller 30 are biased toward each other thus assuring positive contact of the rollers to the electrode. The spring loaded drive system will permit adjustment of the roller spacing to accommodate for the electrodes that are not straight, show a variation in diameter within a given nominal size or have nonuniform electrode joints. Thus, when the motor 38 is energized drive gear 34 turns driven gear 32 which in turn turns the drive roller 30 to advance the electrode out of the nozzle assembly 76. At the same time current is fed through ring 70 through flexible connector 96 to upper shoe 92 and to the electrode. Simultaneously therewith air through the concentric cable (not shown) enters ring 74 through annulus 78 passes through passage 90 and out through orifices 88 in lower shoe 86. Positioning of the orifices 88 directs the air flow along the electrode toward the arc.

With a torch according to the present invention air flowing in ring 74 will cool the ring and hence by conduction through flexible strap 96 provide cooling to the upper shoe 92. Air flowing through passage 70 in lower shoe assembly 82 will cool the entire lower shoe assembly 82 thus result in cooler operation of the automatic torch.

A torch according to the present invention provides for an electrode drive system wherein electrodes varying in diameter from 5/16 inches to ¾ inches (7.9 mm to 12.7 mm) in diameter having successively jointed ends can be used without changing the drive mechanism.

The drive mechanism according to the present invention is self aligning. The unique design automatically adjusts drive wheel pressure which will compensate for changes in the diameter of the electrode, straightness of the electrode and compensates for mis-alignment of the male and female portions of the socket of successively jointed electrodes.

The nozzle according to the present invention is constructed so that it transmits electric current and compressed air through the same members thus controlling temperature and permitting continuous use of the torch. The upper shoe 92 can be mounted to be resiliently in contact with the electrode if electrodes are encountered which have severe dimensional inconsistencies.

The nozzle of the present invention together with the annular ring 74 provides for increased air efficiency by reducing turbulance of the process air by allowing the process air to expand in the annulus 78 before being conducted to the discharge orifices 88. This permits reduction in the operating air pressure in the torch which leads to reduced operating noise level of the torch. Reduction of pressure in the torch requires less compressed air and thus saves energy in the conventional shop system utilizing an automatic air-carbon arc cutting and gouging torch.

Having thus described our invention what we desire to be secured by Letter Patent of the United States is set forth in the appended claims.

What we claim is:

1. In an automatic air-carbon arc cutting and gouging torch of the type adapted for positioning at a fixed position relative to a workpiece and having a nozzle for supporting a consumable electrode juxtaposed to a workpiece said nozzle having means to direct at least one stream of air along said electrode said torch including means to continuously feed successive jointed lengths of electrode through said nozzle to said workpiece as said electrode is consumed the improvement comprising:

a housing having an inlet aperture and an outlet aperture aligned therewith to permit electrode movement through said housing;

an adjustable first or drive wheel pivotably mounted in said housing said drive wheel adapted for frictional contact with said electrode to move said electrode through said housing;

an adjustable second or idler wheel pivotably mounted in juxtaposition to said drive wheel to exert a clamping force on said electrode in concert with said drive wheel;

means to independently adjust the position of said drive and idler wheels relative to each other;

means to bias said drive and idler wheels toward each other while allowing said drive and idler wheels to move away from each other to accomodate non-uniform electrodes; and means to move said drive wheel to advance said electrode as it is consumed;

whereby said torch can feed successive lengths of jointed electrodes regardless of joint fit without crushing and prevent breaking electrodes of non-uniform lengths due to an excessive bending moment imposed by non-pivoting drive and idler wheels.

2. A torch according to claim 1 wherein said biasing means includes a coil spring.

3. A torch according to claim 1 wherein said means to adjust said drive and idler wheel includes a push rod mounted to exert a force on a mounting arm holding each of said drive and idler wheels, said push rods activated by an associated knob threadably mounted on said housing for acting on said push rods.

4. A torch according to claim 1 wherein said means to move said drive wheel includes a gear set with a driver gear mounted in a drive wheel shaft and a drive wheel driven by a synchronous stepping motor.

5. A torch according to claim 4 wherein said synchronous stepping motor is adapted for control by electric means sensing the height of said nozzle from said workpiece.

6. A torch according to claim 1 wherein said nozzle includes a first or bottom electrode supporting shoe having means to direct at least one stream of air along said electrode toward the end projecting from said housing and a second or upper electrode clamping shoe both shoes adapted to carry electrical current to said electrode.

7. A torch according to claim 6 wherein an air chamber is included upstream of said bottom shoe to receive air from a source and allow it to expand there minimizing turbulence and reducing the operating air pressure across the nozzle.

8. A torch according to claim 6 wherein said nozzle is electrically insulated from said housing and surrounded by an insulating cover.

9. A torch according to claim 6 wherein said bottom shoe and said upper shoe are removable so that different shoes can be used with different size electrodes and all of said shoes are mounted for movement toward and away from each other to facilitate good electrical contact with said electrode.

10. A torch according to claim 6 wherein the electrode contact surfaces of said upper shoe and said bottom are opposed U and V shaped grooves aligned parallel to the longitudinal axis of an electrode fed through said torch.

* * * * *